United States Patent
Yamane et al.

(10) Patent No.: US 7,601,428 B2
(45) Date of Patent: Oct. 13, 2009

(54) FLUORINE-CONTAINING ORGANOPOLYSILOXANE, A SURFACE TREATMENT COMPOSITION COMPRISING THE SAME AND AN ARTICLE TREATED WITH THE COMPOSITION

(75) Inventors: Yuii Yamane, Annaka (JP); Noriyuki Koike, Takasaki (JP); Koichi Yamaguchi, Takasaki (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 438 days.

(21) Appl. No.: 11/657,108

(22) Filed: Jan. 24, 2007

(65) Prior Publication Data

US 2007/0197758 A1 Aug. 23, 2007

(30) Foreign Application Priority Data

Jan. 25, 2006 (JP) ............................ 2006-016240
Apr. 5, 2006 (JP) ............................ 2006-104216
Jan. 12, 2007 (JP) ............................ 2007-004899

(51) Int. Cl.
*B32B 9/04* (2006.01)
*C08G 77/46* (2006.01)
(52) U.S. Cl. .......................... 428/447; 528/25; 528/31; 528/35
(58) Field of Classification Search .................... None
See application file for complete search history.

(56) References Cited

U.S. PATENT DOCUMENTS

| | | | |
|---|---|---|---|
| 4,765,729 A | 8/1988 | Taniguchi et al. | |
| 6,552,152 B2 * | 4/2003 | Sakano et al. | 528/42 |
| 6,979,710 B2 * | 12/2005 | Osawa et al. | 524/588 |
| 2002/0095009 A1 * | 7/2002 | Sato et al. | 524/493 |
| 2003/0139620 A1 | 7/2003 | Yamaguchi et al. | |
| 2004/0034135 A1 * | 2/2004 | Koike et al. | 524/261 |
| 2004/0047047 A1 | 3/2004 | Yamaguchi et al. | |
| 2007/0149746 A1 * | 6/2007 | Yamane et al. | 528/42 |

FOREIGN PATENT DOCUMENTS

| | | |
|---|---|---|
| EP | 1300433 A2 | 4/2003 |
| JP | 58-122979 A | 7/1983 |
| JP | 58-167597 A | 10/1983 |
| JP | 6-5324 A | 1/1994 |
| JP | 9-258003 A | 10/1997 |
| JP | 11-29585 A | 2/1999 |
| JP | 2001-188102 A | 7/2001 |
| JP | 2002-348370 A | 12/2002 |
| JP | 2003-113244 A | 4/2003 |
| JP | 2003-238577 A | 8/2003 |

* cited by examiner

*Primary Examiner*—Marc S Zimmer
(74) *Attorney, Agent, or Firm*—Birch, Stewart, Kolasch & Birch, LLP

(57) ABSTRACT

A fluorine-containing organopolysiloxane represented by the following average compositional formula (1)

$$(Z^2Q)_\beta Rf(QZ^1A_\alpha)_{2-\beta} \quad (1)$$

wherein Rf is a divalent group containing a perfluoroether residue,
Q is a divalent organic group,
$Z^1$ is a di- to nona-valent organopolysiloxane residue and may contain a silalkylene bond,
α is an integer of from 1 to 8,
β is a number larger than 0 and smaller than 2,
$Z^2$ is a monovalent group represented by the following formula (2)

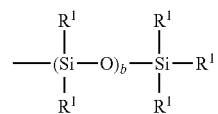

(2)

wherein b is an integer of from 1 to 10, $R^1$ may be the same with and different from each other and is an alkyl group having 1 to 4 carbon atoms or a phenyl group, and
A is a monovalent group represented by the following formula (3)

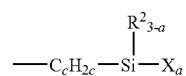

(3)

wherein $R^2$ is an alkyl group having 1 to 4 carbon atoms or a phenyl group, X is a hydrolyzable group, a is 2 or 3, and c is an integer of from 1 to 6.

12 Claims, 4 Drawing Sheets

FLUORINE-CONTAINING ORGANOPOLYSILOXANE, A SURFACE TREATMENT COMPOSITION COMPRISING THE SAME AND AN ARTICLE TREATED WITH THE COMPOSITION

This application claims benefit of Japanese Patent application No. 2006-16240 filed on Jan. 25, 2006, Japanese Patent application No. 2006-104216 filed on Apr. 5, 2006, and Japanese Patent application No. 2007-004899 filed on Jan. 12, 2007, the contents of which are hereby incorporated by reference.

FIELD OF THE INVENTION

The present invention relates to a fluorine-containing organopolysiloxane, a surface treatment composition comprising the same and an article treated by the composition. The organopolysiloxane forms a water- and oil-repellent coating layer which bonds strongly to a substrate and is resistant to scrubbing.

BACKGROUND OF THE INVENTION

Compounds containing perfluoropolyether moieties generally have very small surface free energy to have water and oil repellency, chemical resistance, lubricity, releasing property, and antifouling property. Making use of these properties, they are widely used as, for example, treatment agents to make paper or fiber water- and oil- repellent, and foul-resistant, lubricants for magnetic storage media, oil repellent agents for precision apparatuses, releasing agents, cosmetics, and protective films.

These properties, on the other hand, mean that such a fluorine-containing compound does not bond to other materials. Even if it can be applied to a substrate, it hardly forms a coating bonded strongly to the substrate.

Meanwhile, it is well known that an organic compound can be bonded to a surface of glass or cloth via a silane coupling agent. The silane coupling agent has an organic functional group and a reactive silyl group, usually an alkoxy silyl group. The alkoxy silyl groups are autocondensed in the presence of moisture to form a siloxane coating film. At the same time, the alkoxy silyl group chemically bonds to glass or metal surface to form a durable film. The silane coupling agents are thus widely used as coating agents for various substrates.

Japanese Patent Application Laid-Open No. S58-167597 discloses a fluoroaminosilane compound represented by the following formula (8):

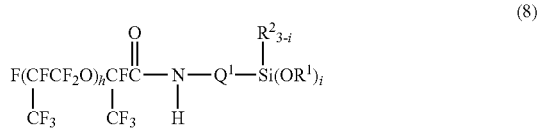

(8)

wherein $R^1$ and $R^2$ are alkyl groups having 1 to 4 carbon atoms, $Q^1$ is $CH_2CH_2CH_2$ or $CH_2CH_2NHCH_2CH_2CH_2$, h is an integer of from 1 to 4, and i is 2 or 3.

The perfluoropolyether moiety of the compound, however, is relatively short, i.e., a dimer to pentamer of hexafluoropropylene oxide, so that the aforesaid characteristics of the perfluoropolyether are not significant.

Japanese Patent Application Laid-Open No. S58-122979 discloses a water- and oil-repellent agent for glass surface. The agent is represented by the following formula:

(9)

wherein $Rf^1$ is a polyfluoroalkyl group having 1 to 20 carbon atoms and may contain one or more of ether group, $R^3$ is a hydrogen atom or a lower alkyl group, A is an alkylene group, $X^1$ is —$CON(R^4)$-Q- or $SO_2N(R^4)$-Q-, wherein $R^4$ is a lower alkyl group and Q is a divalent organic group, Z is a lower alkyl group, Y is a halogen atom, alkoxy group or $R^5COO$—, wherein $R^5$ is a hydrogen atom or a lower alkyl group, s is 0 or 1, t is an integer of from 1 to 3, u is an integer of from 0 to 2. The fluorinated group of this compound has carbon atoms not more than 20, so that effects of the fluorinated group are not sufficient.

Recently, needs for technology to attain foul-resistance and easy removal of fouling are increased, for example, to make maintenance free windows of high buildings and fingerprint-proof displays. Materials which meet these requirements are desired.

Japanese Patent Application Laid-Open No. 9-258003 discloses a lens which has an antifouling layer prepared from a fluorine-containing silane compound. The fluorine-containing silane compound has both properties of aforesaid perfluoropolyether moiety and silane coupling agent. The compound has relatively larger amount of hydrolyzable groups per molecule. However, a coating prepared from the compound does not strongly bond to a substrate and is not sufficiently durable. When applied to a lens, desired properties are not maintained for a long time.

An antireflection layer, which is generally formed on visual tools and equipments, is prone to be fouled with fingerprints, sweat, saliva, or hair dressing. The fouling causes change in surface reflectance. Further, the fouling stands out as white object to be more eminent than those on an ordinary transparent object. Therefore, an antireflection layer is desired which has excellent antifouling property, and is easy to clean and durable.

Japanese Patent Publication of Examined Application No. 6-5324 discloses an antireflection film having improved antifouling property. The layer is formed on an antireflective monolayer or multilayer mainly composed of silicon dioxide deposited by PVD method. The layer is composed of organopolysiloxane polymer or perfluoroalkyl group-containing polymer.

Fouling by human secretion and fingerprint, however, is difficult to wipe off from the layer and tends to extend to form a thin oily film. When it is rubbed strongly, the antireflection film itself is damaged.

Japanese Patent Application Laid-Open No. 11-29585 discloses an antireflection film having an antifouling layer prepared from a perfluoropolyether-modified aminosilane represented by the following formula (10):

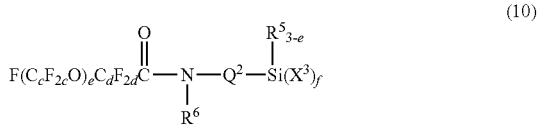

(10)

wherein $X^3$ is a hydrolyzable group, $R^5$ is a lower alkyl group, $R^6$ is a hydrogen atom or a lower alkyl group, $Q^2$ is $CH_2CH_2CH_2$ or $CH_2CH_2NHCH_2CH_2CH_2$, e is an integer of from 6 to 50, f is 2 or 3, and c and d are integers of from 1 to 3.

The aforesaid aminosilane takes a relatively long time for curing due to a relatively small wt % of the hydrolyzable group based on its molecular weight. Further, the cured coating layer does not bond strong enough to a substrate.

Japanese Patent Application Laid-Open No. 2001-188102 discloses an antireflection film having an antifouling layer prepared from a perfluoropolyether moiety-containing silane coupling agent represented by the following formula (11):

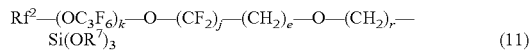
(11)

wherein $Rf^2$ is a linear or branched perfluoroalkyl group having 1 to 16 carbon atoms, $R^7$ is a $C_{1-10}$ alkyl group, k is an integer of from 1 to 50, r is an integer of from 0 to 6, j is an integer of from 0 to 3, and l is an integer of from 0 to 3, with j+l being larger than 0 and 6 or smaller.

The aforesaid perfluoropolyether moiety-containing silane coupling agent also takes a relatively long time for curing due to a relatively small wt % of the hydrolyzable group based on its molecular weight. Further, the cured coating layer does not bond strongly to a substrate.

Japanese Patent Application Laid-Open No. 2002-348370 and No. 2003-113244 disclose a silane coupling agent which contains a perfluoropolyether moiety and many hydrolyzable groups at one end. The silane coupling agent is described to have a good film forming property.

Japanese Patent Application Laid-Open No. 2003-238577 discloses a silane coupling agent which contains a perfluoropolyether moiety represented by the following formula (12):

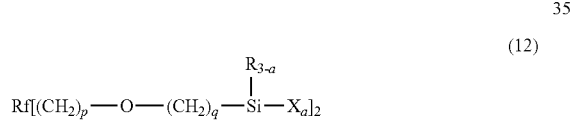
(12)

wherein Rf is a divalent linear perfluoropolyether group, R is a $C_{1-4}$ alkyl or phenyl group, X is a hydrolyzable group, p is an integer of from 0 to 2, q is an integer of from 1 to 5, and a is 2 or 3.

The above silane coupling agent of the formula (12) has two or three hydrolyzable groups per molecule at both ends to form a coating layer which bonds strongly to a substrate. The layer is resistant to fouling. Once it is fouled, however, the fouling is not so easy to wipe off. Ease of cleaning by wiping off depends not only on a coating surface's capability of releasing fouling but also slickness of the surface. Supposing that there are two coatings having equivalent capability of releasing fouling but different surface slickness, the slicker one is easier to clean than the other. Supposing that there are two coatings having equivalent adhesion strength to a substrate but different surface slickness, the slicker one is more resistant to scrubbing.

SUMMARY OF THE INVENTION

An object of the present invention is to provide a substance and a surface treatment composition comprising the same which forms a slick, and water- and oil-repellent coating layer resistant to scrubbing.

The present inventors have found that the following organopolysiloxane having a fluorine-containing moiety and a hydrolyzable group forms a coating layer which is slick, water- and oil-repellent, and resistant to scrubbing.

The present invention is a fluorine-containing organopolysiloxane represented by the following average compositional formula (1)

(1)

wherein Rf is a divalent group containing a perfluoroether residue,

Q is a divalent organic group, $Z^1$ is a di- to nona-valent organopolysiloxane residue and may contain a silalkylene bond, α is an integer of from 1 to 8, β is a number larger than 0 and smaller than 2, $Z^2$ is a monovalent group represented by the following formula (2)

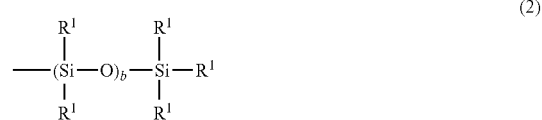
(2)

wherein b is an integer of from 1 to 10, $R^1$ may be the same with and different from each other and is an alkyl group having 1 to 4 carbon atoms or a phenyl group, and A is a monovalent group represented by the following formula (3)

(3)

wherein $R^2$ is an alkyl group having 1 to 4 carbon atoms or a phenyl group, X is a hydrolyzable group, a is 2 or 3, and c is an integer of from 1 to 6.

A coating layer prepared from the present organopolysiloxane strongly bonds to a substrate via the hydrolyzable silyl group. The coating comprises the organosiloxane residues which attain scrub resistance. The organopolysiloxane residues are considered to make a space between fluorine-containing moieties of neighboring molecules to attain uniform oil- and water-repellency. The formula (1) is a compositional formula having β larger than 0, which means that the present organopolysiloxane is a mixture of the one having the hydrolyzable silyl group at one end, hereinafter may be referred to as "one end treatment agent", and the one having the hydrolyzable silyl groups at both ends. It is considered that the former contributes to surface slickness with greater steric freedom of its perfluoropolyether moiety, and the latter contributes to strong bonding to a substrate.

PREFERRED EMBODIMENTS OF THE INVENTION

Figure 1:
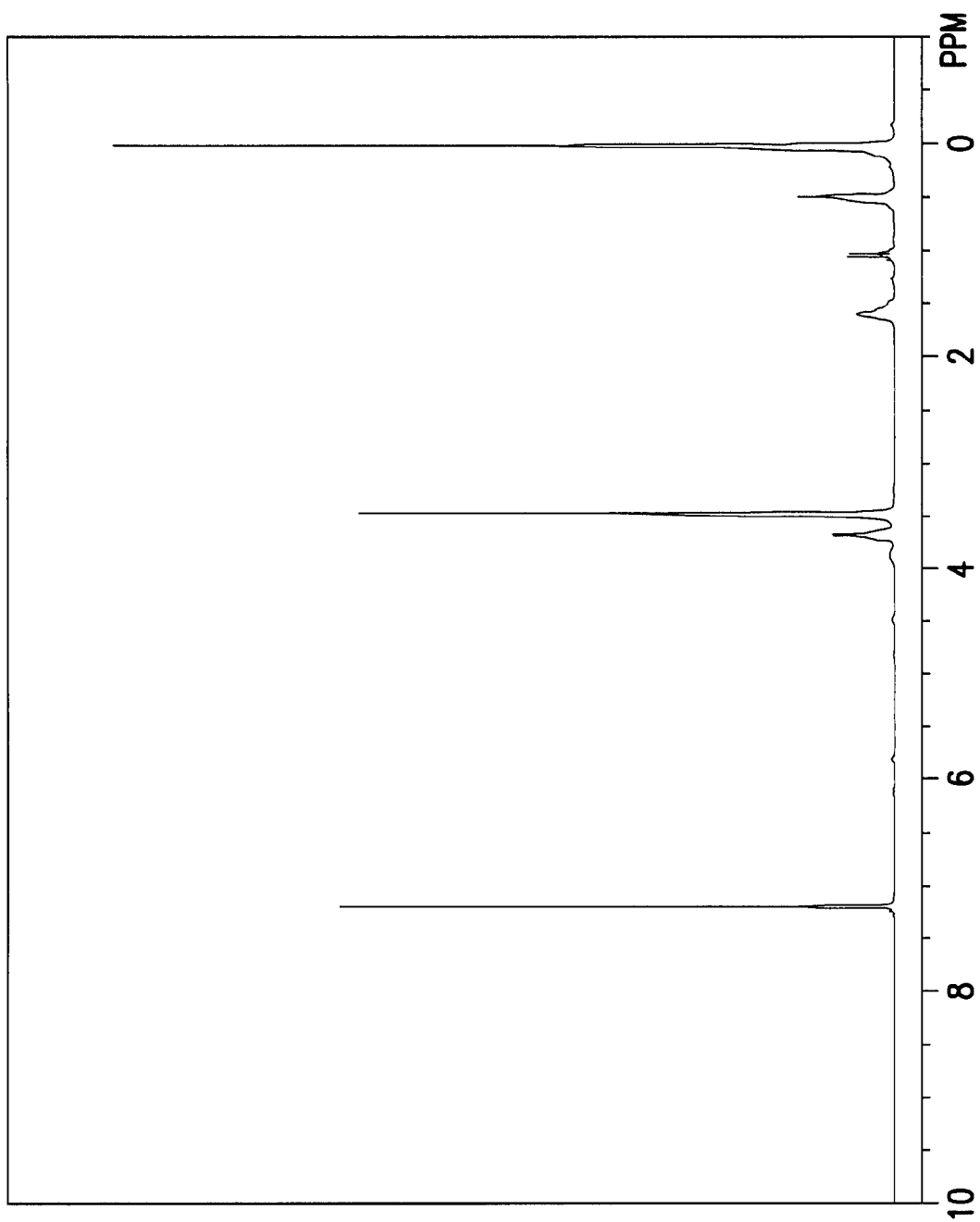
FIG. 1 is an IR chart of Compound 1 prepared in Example 1.

In the above formula (1), A is a monovalent group represented by the following formula (3):

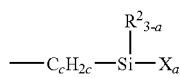
(3)

wherein $R^2$ is an alkyl group having 1 to 4 carbon atoms or a phenyl group, X is a hydrolyzable group, a is 2 or 3 and c is an integer of from 1 to 6.

In the formula (3), X is a hydrolyzable group which may be different from each other. Examples of the hydrolyzable group include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; halogen atoms such as chlorine, bromine, and iodine atoms. Among these, methoxy, ethoxy, iropropenoxy groups and chlorine atom are preferred.

$R^2$ is a lower alkyl group having 1 to 4 carbon atoms such as methyl and ethyl groups, or a phenyl group, among which a methyl group is preferred; a is 2 or 3, preferably 3, because of higher reactivity and stronger bonding to a substrate; and c is an integer of from 1 to 6, preferably from 2 to 5, because of stronger bonding to a substrate and antifouling property.

In the formula (1), Rf contains a divalent perfluoroether residue and may be branched. An exemplary perfluoroether residue contains 1 to 500, preferably 2 to 200, more preferably 10 to 100, repeating units represented by the general formula —$C_gF_{2g}O$—, wherein g is independently an integer of from 1 to 6, preferably from 1 to 4.

Examples of the aforesaid repeating unit —$C_gF_{2g}O$— are as follows, and two or more of them may be included in the perfluoroether residue.

—$CF_2O$—

—$CF_2CF_2O$—

—$CF_2CF_2CF_2O$—

—$CF(CF_3)CF_2O$—

—$CF_2CF_2CF_2CF_2O$—

—$CF_2CF_2CF_2CF_2CF_2CF_2O$—

—$C(CF_3)_2O$—

Preferably, Rf is selected from the groups represented by the following formulas (5), (6) and (7).

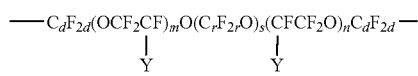
(5)

wherein Y is F or $CF_3$, which may be different with each other, and r is an integer of from 2 to 6, d is an integer of from 1 to 3, each of m and n is an integer of from 0 to 200 with m+n ranging from 2 to 200, s is an integer of from 0 to 6, and the repeating units such as ($C_rF_{2r}O$) may be bonded randomly;

(6)

wherein l is an integer of from 1 to 200. and d is an integer of from 1 to 3;

(7)

wherein Y is F or $CF_3$, d is an integer of from 1 to 3, each of m and n is an integer of from 0 to 200 with m+n ranging from 2 to 200, and the repeating units may be bonded randomly.

The perfluoroether-containing group represented by the following formula (4) is more preferred because it attains desired slickness of a cured coating:

—$CF_2(OC_2F_4)_e(OCF_2)_fOCF_2$— (4)

wherein e is an integer of from 0 to 50 and f is an integer of from 1 to 50 with e+f ranging from 2 to 60.

In the formula (1), Q is a divalent group bonding Rf and $Z^1$ or $Z^2$ group. Preferably, Q is a hydrocarbon group having 3 to 12 carbon atoms and may contain a bond selected from amide, ether, ester and vinyl bonds. Examples of Q are as shown below, wherein the left end of each group is bonded to Rf, and the right end to a silicon atom.

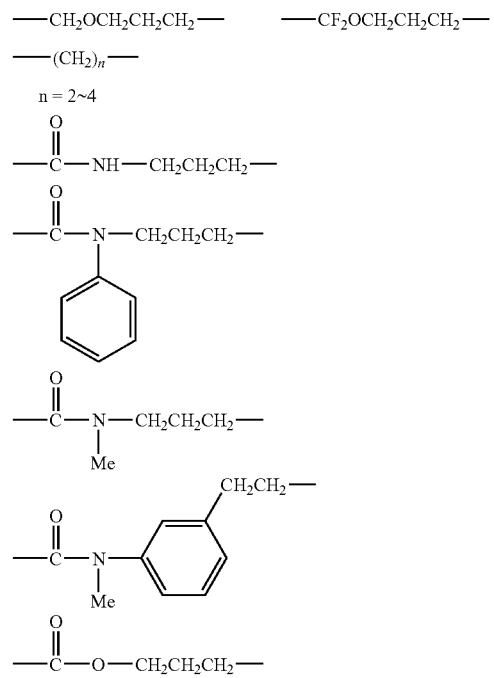

In the formula (1), $Z^1$ and $Z^2$ are organopolysiloxane residues which may contain a silalkylene bond wherein two silicon atoms are bonded via an alkylene group, i.e., Si—$R^2$—Si. The presence of the siloxane moieties in a coating improves scrub resistance.

$Z^1$ may contain a silalkylene bond and is a di- to nonavalent, preferably di- to hexa-valent, organopolysiloxane residue. Examples of $Z^1$ are as shown below. In the examples, Me represents a methyl group, and it may be replaced with other groups such as an alkyl group having 1 to 8, preferably 1 to 4, carbon atoms, or a phenyl group. An alkylene group in the silalkylene group is not limited to an ethylene group, and can be alkylene group having 2 to 6, preferably 2 to 4, carbon atoms.

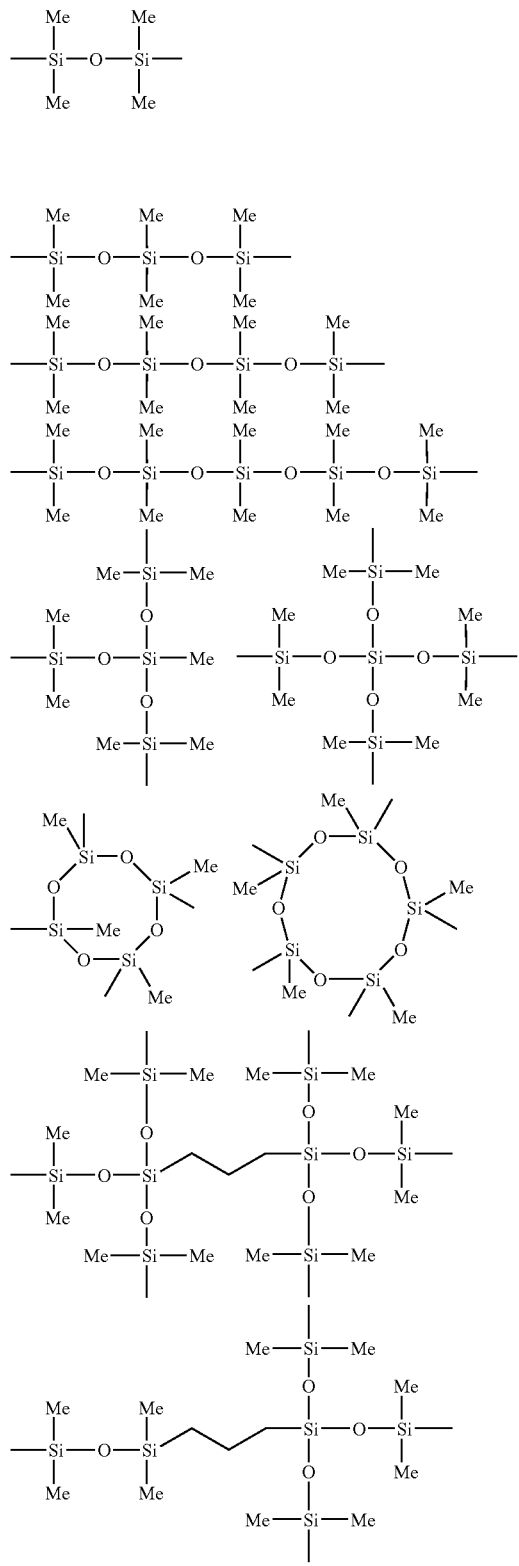

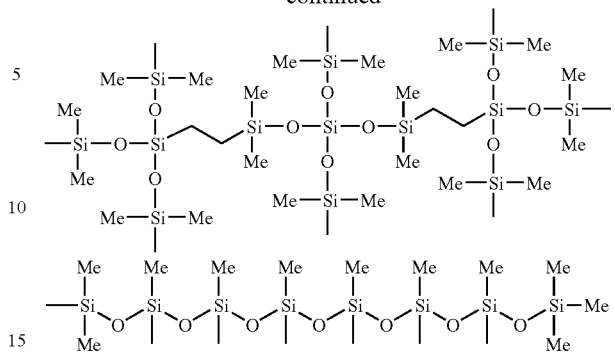

In the formula (1), $\alpha$ is a number that equals to (valence of $Z^1$-1), i.e., 1 to 8, preferably 1 to 5.

$Z^2$ is a monovalent group represented by the following formula (2):

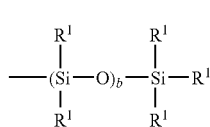

(2)

wherein b is an integer of from 1 to 10, preferably from 1 to 5, more preferably 1. $R^1$ is an alkyl group having 1 to 4 carbon atoms such as a methyl, ethyl, or phenyl group, preferably a methyl group. $R^1$ may be a mixture of different alkyl groups.

Preferably, $Z^2$ is a monovalent group represented by the following formula:

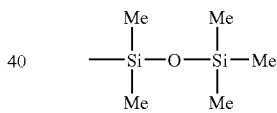

wherein Me represents a methyl group.

The present organopolysiloxane can be prepared by the following method.

A compound having unsaturated bonds at both sides of Rf of the formula shown below and an organohydrogenpolysiloxane that is used to derive $Z^2$ and has a SiH bond at a site intended to bond QRf are subjected to an addition reaction in the presence of an addition reaction catalyst such as a platinum compound in a conventional manner:

wherein Rf is as defined above, and Q' is a group containing an unsaturated group such as those shown below:

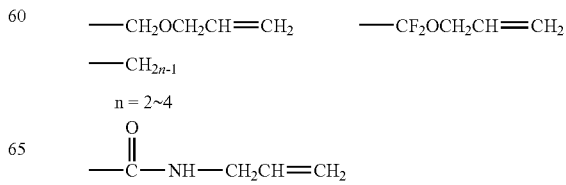

-continued

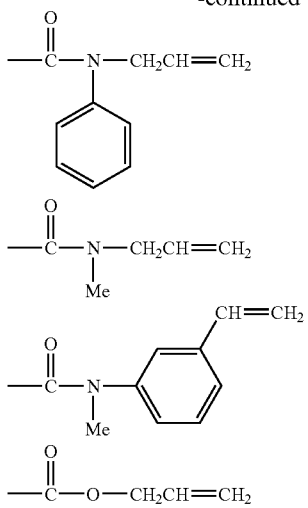

Separately, a compound having an unsaturated bond and the hydrolyzable group X of the formula shown below:

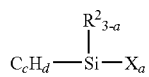

wherein $R^2$, X, a, c are as defined above and d equals (2c−1), is reacted with an organohydrogenpolysiloxane that is used to derive $Z^1$ and has SiH bonds at sites intended to bond one or more of A and at least one other site intended to bond QRf are subjected to an addition reaction to prepare an organohydrogenpolysiloxane containing the hydrolyzable group X.

Remaining SiH bond of the obtained organohydrogenpolysiloxane containing the hydrolyzable group X is then addition-reacted with remaining unsaturated group of the above compound Q'RfQ'.

Alternatively, the organohydrogenpolysiloxane used to derive $Z^1$ is reacted with Q'RfQ' first, and then reacted with the aforesaid compound having an unsaturated bond and the hydrolyzable group X.

A value of β in the formula (1) can be varied by changing a molar ratio of an organohydrogenpolysiloxane used to derive $Z^1$ and the one used to derive $Z^2$, a sequence of addition reactions. Preferably, β ranges from 0.5 to 1.5.

The present invention also provides a surface treatment composition comprising the aforesaid organopolysiloxane as an active ingredient. The composition may contain partial condensation products of hydrolyzates of the organopolysiloxane which can be obtained by subjecting the organopolysiloxane to hydrolysis and condensation reactions in a conventional manner.

The surface treatment composition can contain a catalyst for hydrolysis and condensation reactions. Examples of the catalyst include organic tin compounds such as bibutyltin dimethoxide and dibutyltin dilaurate; organic titanium compounds such as tetra-n-butyl titanate; organic acids such as acetic acid and methanesulfonic acid; inorganic acids such as hydrochloric acid and sulfuric acid, among which acetic acid, tetra-n-butyl titanate, and dibutyltin dilaurate are preferred. A content of the catalyst may be a catalytic amount, which typically ranges from 0.01 to 5 parts by weight, particularly from 0.1 to 1 part by weight per 100 parts by weight of the organopolysiloxane and/or partial condensate of hydrolyzate thereof.

The surface treatment composition may contain a solvent. Examples of the solvent include fluorine-modified aliphatic hydrocarbon solvents such as perfluoroheptane and perfluoroctane; fluorine-modified aromatic hydrocarbon solvents such as m-xylenehexafluoride and bezotrifluoride; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine, and perfluorotripentylamine; hydrocarbon solvents such as petroleum benzene, mineral spirits, toluene, and xylene; ketone solvents such as acetone, methylethylketone, and methylisobutylketone. Among these, fluorinated solvents are preferred such as m-xylenehexafluoride, perfluoro(2-butyltetrahydrofuran), perfluorotributylamine and ethyl perfluorobutyl ether because of higher dissolving capability and substrate wettability.

A mixture of two or more of the aforesaid solvents may be used. Preferably, the present fluorine-containing organopolysiloxane and/or partial condensation products of hydrolyzates thereof is dissolved homogeneously. The organopolysiloxane and/or partial condensate of hydrolyzates thereof is diluted with the solvent to a concentration of from 0.01 to 50 wt %, particularly from 0.05 to 20 wt %.

The surface treatment composition may be applied to a substrate by any known methods such as brushing, dipping, spraying and vapor deposition. Applied composition is processed at a temperature selected depending on the application method. When applied by brushing or dipping, the composition is processed at a temperature preferably of from room temperature to 120° C., more preferably in a humidified environment to promote curing reaction. A cured coating layer of the composition typically has a thickness of from 0.1 nm to 5 μm, particularly from 1 to 100 nm.

The present surface treatment composition may be applied to paper, cloth, metal and metal oxide, glass, plastic, or ceramics to provide water and oil repellency, releasing property, and foul resistance.

The present surface treatment composition can be used for various applications, for example, fingerprint- or sebum-proof coating of optical parts such as spectacle lenses, and antireflection filter; water repellent or antifouling coating of sanitary products such as bathtubs and wash-basins; antifouling coating of window glasses of automobiles, trains, airplanes, and headlamp covers; water repellent or antifouling coating of exterior wall materials; oil-repellent coating of kitchen architectural material; fingerprint-proof coating of compact disks or DVD. It may be used also as a coating additive, a resin improver, a dispersion or flow improver for inorganic filler, and a lubricity improver for tape or film.

EXAMPLES

The present invention is explained with reference to the following examples, but not limited thereto.

Example 1

In a reactor, 50 g of perfluoropolyether compound represented by the following formula (I) having α, ω-unsaturated bonds,

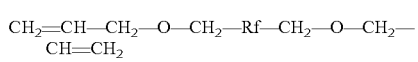

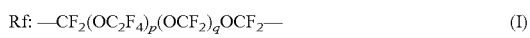 (I)

wherein p/q is 0.9 and p+q is about 45 on average, 75 g of 1,3-trifluoromethylbenzen, and 0.0442 g, i.e., $1.1 \times 10^{-7}$ mole as Pt, of a solution of a complex of chloroplatinic acid with a vinylsiloxane in toluene are placed and heated to 90° C. while stirring. To the mixture obtained, 1.85 g of pentamethyldisiloxane was added dropwise and heated at 90° C. for 2 hours. Then, 7.5 g of the compound of the following formula (II) that is a 1:1 adduct of tetramethyldisiloxane (HM) and vinyltrimethoxysilane(VMS), hereinafter referred to as HM-VMS adduct,

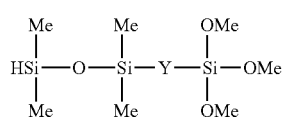
(II)

wherein Me represents a methyl group, and Y represents —$C_2H_4$, was added dropwise and heated at 90° C. for 2 hours. After confirming that no allyl group remained by $^1$H-NMR, the solvent and unreacted pentamethyldisiloxane and HM-VMS adduct were removed by vacuum evaporation. Liquid perfluoropolyether-modified organopolysiloxane, hereinafter referred to as Compound 1, in an amount of 50.5 g were obtained. Compound 1 had a specific gravity of 1.63 and a refractive index of 1.319.

The HM-VMS adduct was prepared by the following method. In a reactor, 40 g of tetramethyldisiloxane (HM) and 40 g of toluene were mixed and heated to 80° C., to which 44.2 g of vinyltrimethoxysilane(VMS) and 0.0442 g, i.e., $1.1 \times 10^{-7}$ mole as Pt, of a solution of a complex of chloroplatinic acid with a vinylsiloxane in toluene were added dropwise slowly. By purifying the reaction mixture thus obtained by evaporation, 84 g of HM-VMS adducts was obtained.

Figure 2:
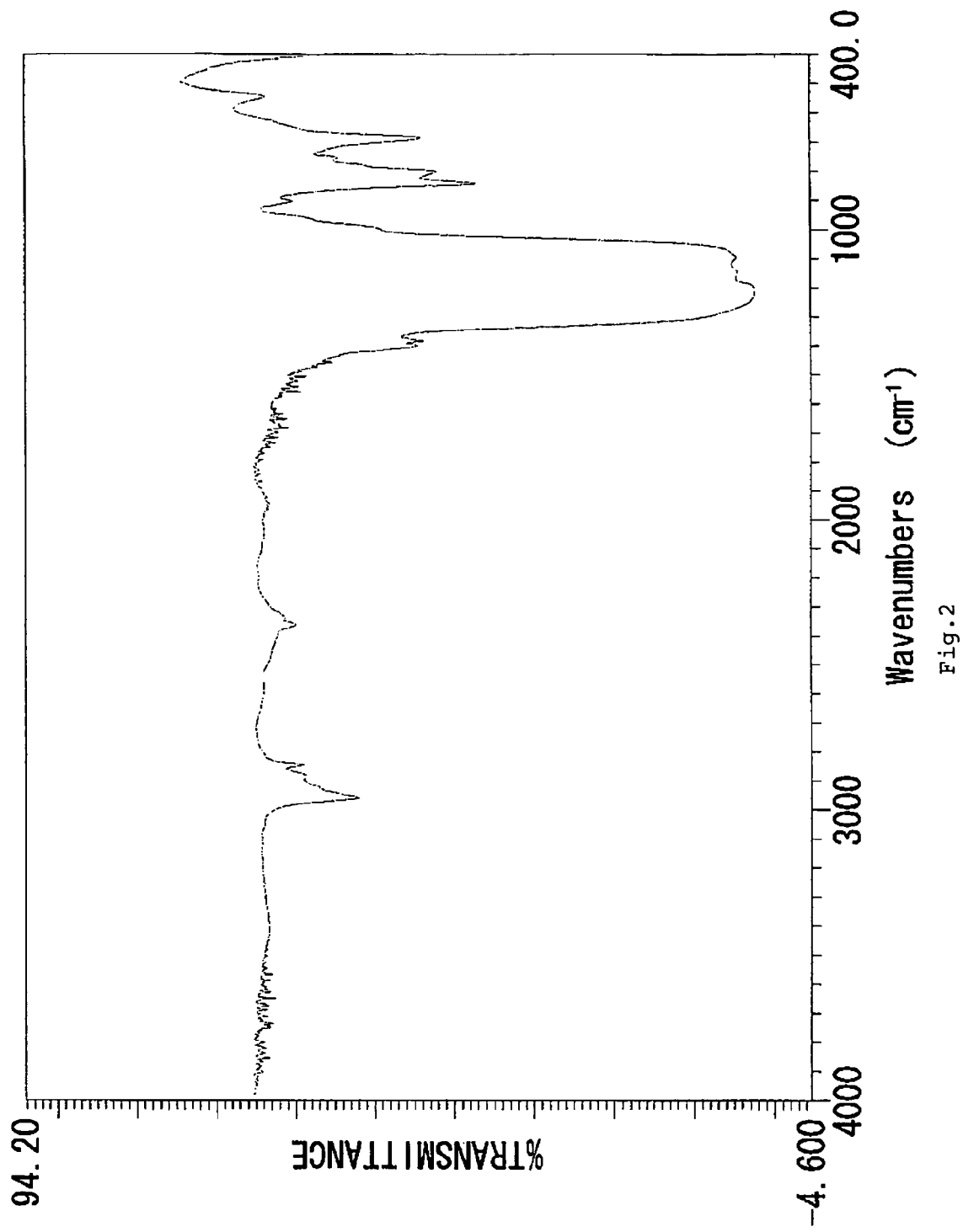
FIG. 2 is a $^1$H-NMR chart of Compound 1 prepared in Example 1.

Compound 1 showed IR and $^1$H-NMR spectra as shown in FIGS. 1 and 2 with the following chemical shifts from TMS.

$^1$H-NMR spectra (δ, ppm)

| | |
|---|---|
| —SiCH$_3$, —CH— | 0.03~0.07 ppm |
| ≡SiCH$_2$CH$_2$Si≡ | 0.50 ppm |
| —CH— <br> \| <br> CH$_3$ | 1.10 ppm |
| —CH$_2$CH$_2$Si≡ | 1.61 ppm |
| —SiOCH$_3$ | 3.47~3.51 ppm |
| —CH$_2$OCH$_2$— | 3.51~3.70 |

From the above data, Compound 1 was found to have the following structure:

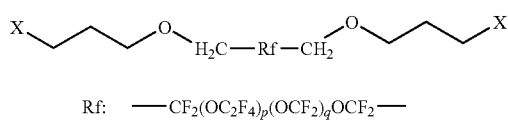

Rf: —$CF_2(OC_2F_4)_p(OCF_2)_qOCF_2$— wherein p/q is 0.9 and p+q is 45 on average and X is a mixture of the groups of the following formulas (a) and (b),

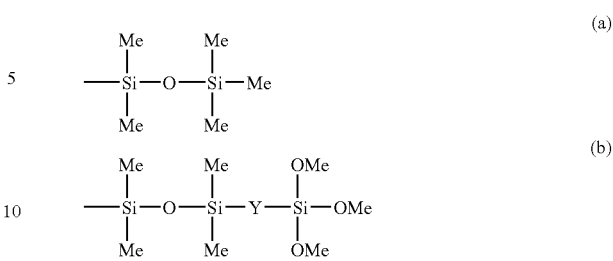

wherein Me represents a methyl group, and Y represents —$C_2H_4$, in a molar ratio of 38:62, that is, β in the formula (1) was 0.76.

Example 2

In a reactor, 50 g of perfluoropolyether compound represented by the above formula (I) having α, ω-unsaturated bonds, 75 g of 1,3-trifluoromethylbenzen, and 0.0442 g, i.e., $1.1 \times 10^{-7}$ mole as Pt, of a solution of a complex of chloroplatinic acid with a vinylsiloxane in toluene are placed and heated to 90° C. while stirring. To the mixture obtained, 1.85 g of pentamethyldisiloxane was added dropwise and heated at 90° C. for 2 hours. Then, 20.5 g of the compound of the following formula (III), hereinafter referred to as H4Q, was added dropwise and heated at 90° C. for 3 hours. After confirming that no allyl group remained by $^1$H-NMR, the solvent and unreacted H4Q were removed by vacuum evaporation. By treating the evaporation residue with active carbon, 46.8 g of colorless and transparent liquid perfluoropolyether-modified organopolysiloxane was obtained.

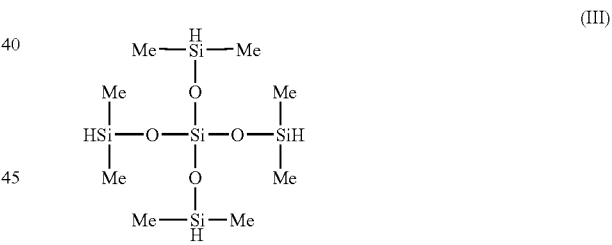
(III)

Subsequently, in a reactor, 25 of the aforesaid perfluoropolyether-modified organopolysiloxane, 30 g of 1,3-trifluoromethylbenzen, and 0.0225 g, i.e., $2.2 \times 10^{-6}$ mole as Pt, of a solution of a complex of chloroplatinic acid with a vinylsiloxane in toluene were placed and heated to 90° C. while stirring. To the mixture obtained, 4.63 g of trimethoxysilane was added dropwise and heated at 80° C. for 3 hours while stirring. By removing the solvent by vacuum evaporation, 26.8 g of a compound, hereinafter referred to as Compound 2, was obtained. Compound 2 was colorless and transparent liquid having a specific gravity of 1.65 and a refractive index of 1.313.

Figure 3:
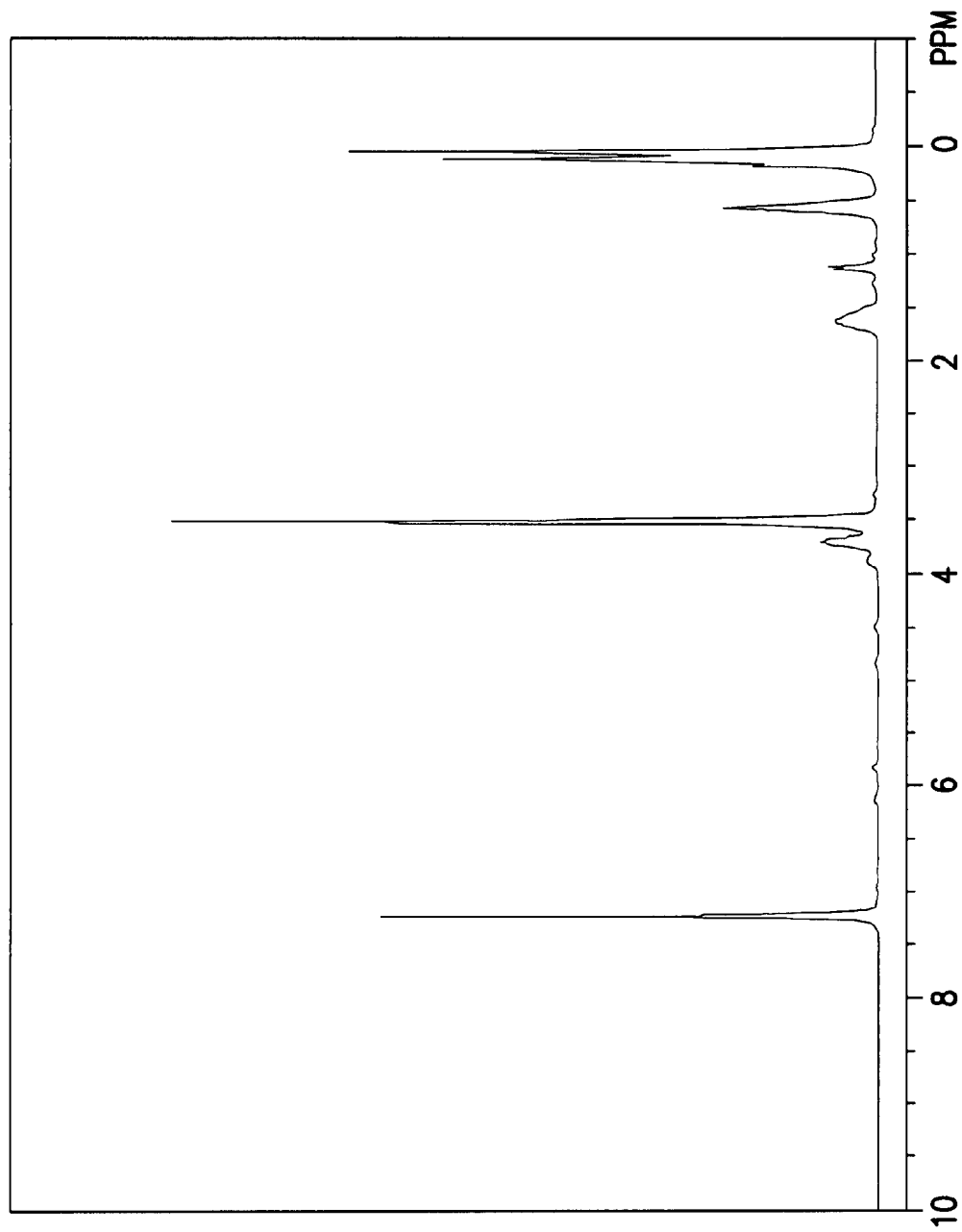
FIG. 3 is an IR chart of Compound 2 prepared in Example 2.
Figure 4:
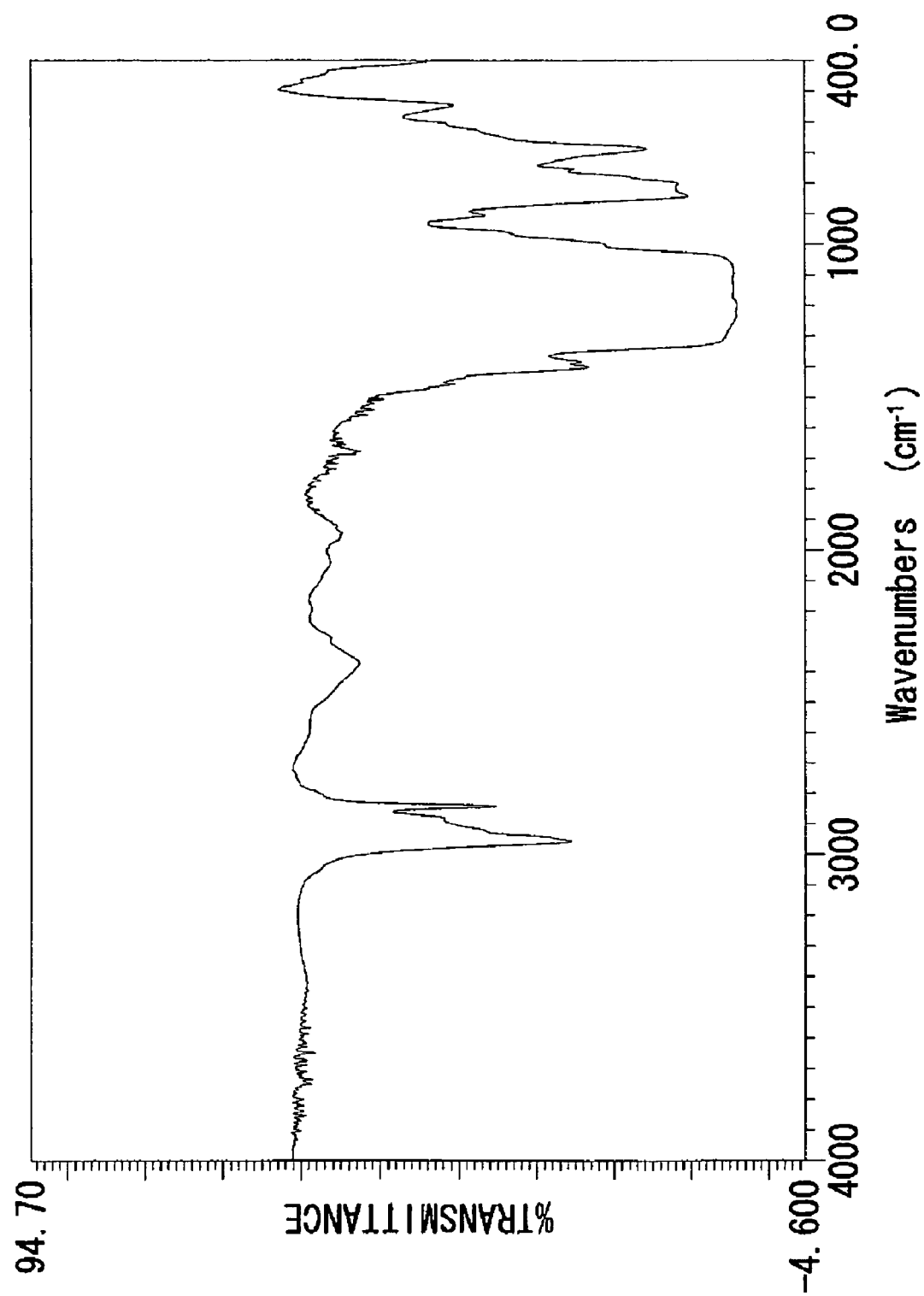
FIG. 4 is a $^1$H-NMR chart of Compound 2 prepared in Example 2.

Compound 2 showed IR and $^1$H-NMR spectra as shown in FIGS. 3 and 4 with the following chemical shifts from TMS. In the NMR spectrum, the peak around 2.7 ppm is assigned to benzene added to the sample.

$^1$H-NMR spectra (δ, ppm)

| | |
|---|---|
| —SiCH₃, —CH— | 0.03~0.08 ppm |
| ≡SiCH₂CH₂Si≡ | 0.54 ppm |
| —CH—<br>\|<br>CH₃ | 1.10 ppm |
| —CH₂CH₂Si≡ | 1.59 ppm |
| —SiOCH₃ | 3.49 ppm |
| —CH₂OCH₂— | 3.68 ppm |

From the above data, Compound 2 was found to have the following structure:

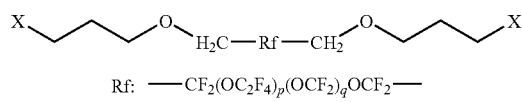

Rf: —CF$_2$(OC$_2$F$_4$)$_p$(OCF$_2$)$_q$OCF$_2$— wherein p/q is 0.9 and p+q is about 45 on average and X is a mixture of the groups of the following formulas (c) and (d),

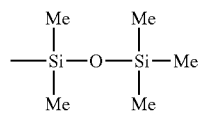
(c)

-continued

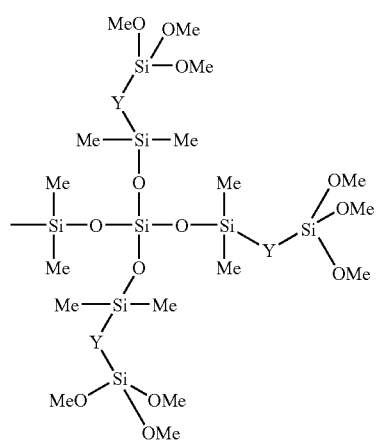
(d)

wherein Me represents a methyl group and Y represents —C$_2$H$_4$, in a molar ratio of 57:43, that is, β in the formula (1) was 1.14.

Preparation of Surface Treatment Compositions and Cured Coatings

Surface treatment compositions 1 and 2 were prepared by dissolving each of the Compounds 1 and 2, respectively, in 1,3-trifuluoromethylbenzene to obtain 20 wt % solution.

A cured coating was prepared by vacuum-depositing 10 mg of a surface treatment composition at a pressure of 3.8× 10$^{-3}$ Pa and a temperature of 740° C. on a SiO$_2$ layer of a 8 cm×15 cm×0.2 cm sheet of an antireflection film that is a polyethylene terephthalate film with SiO$_2$ deposed on a surface thereof, and then keeping the vacuum-deposited composition in an environment of a temperature of 40° C. and a relative humidity of 80% for 24 hours.

Comparative Surface Treatment Compositions

Comparative surface treatment compositions 3 and 4 were prepared in the same manner as described above by dissolving each of the following Compounds 3 and 4. A sheet of an antireflection film was treated with each of the surface treatment compositions 3 and 4 in the same manner as described above.

Compound 3

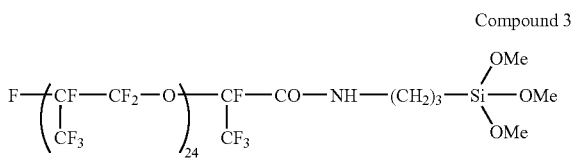

Compound 4

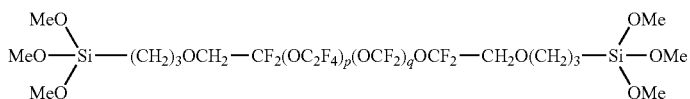

(p/q is 0.9, and p+q is 45 on average.)

Evaluation of the Cured Coating Layer

Cured coating layers obtained were evaluated according to the following methods. The results are as shown in Tables 1 and 2.

Water Repellency and Oil Repellency

Using a contact angle meter, Model A3, ex Kyowa Inter-FACE Science Co.,Ltd., a water contact angle and an oleic acid receding contact angle of a cured coating layer were measured by sliding method. A water contact angle was also measured after each of the cleaning and the rubbing tests described below.

Slickness of the Coating Surface

Slickness of a coating surface was evaluated by the following sensory test performed by seven panelists.

The seven panelists lightly scrubbed a coating layer with a finger covered with four sheets of nonwoven cloth (Bencot, ex Asahi kasei Co.) laid top on another and rated surface slickness of the coating layer according to the following criteria:

+: Slicker than the coating layer made from Compound 3.

0: As slick as the coating layer made from Compound 3.
−: Less slick than the coating layer made from Compound 3.

In the Tables 1 and 2, "A" means that four or more of the panelists rated as "+", "C" means that four or more of the panelists rated as "−", and "B" means not A nor C.

This test was performed also after each of the cleaning and the rubbing tests described below.

Cleaning Test

A coating layer was rinsed with a detergent, AK225, ex Asahi Kasei Co., for 30 seconds and then dried.

Scrubbing Test

Using a rubbing tester, ex Shinto Scientific Co., Ltd., the cured coating was scrubbed under the following conditions:
Test environment: 25° C., relative humidity of 40%
Scrubbing material: The coating layers were scrubbed with a tip of the tester which was covered by eight sheets of nonwoven cloth (1.5 cm×1.5 cm) laid top on another and fixed by a rubber band.
Scrub distance (one way): 4 cm
Scrub speed: 500 cm/min
Load: 1 kg
Number of scrubbing: 2,000 times

TABLE 1

| | Compound No. | Water contact angle, deg | Oleic acid receding contact angle, deg | Slickness |
|---|---|---|---|---|
| Examples | 1 | 108 | 66 | A |
| | 2 | 109 | 68 | A |
| Comparative | 3 | 115 | 71 | B |
| Examples | 4 | 109 | 68 | C |

TABLE 2

| | Compound No. | After Cleaning | | After Scrubbing | |
|---|---|---|---|---|---|
| | | Water contact angle, deg | Slickness | Water contact angle, deg | Slickness |
| Examples | 1 | 108 | B | 107 | A |
| | 2 | 110 | B | 109 | A |
| Comparative | 3 | 116 | C | 108 | C |
| Examples | 4 | 110 | C | 80 | C |

As is understood from Tables 1 and 2, the coatings prepared from Compounds 1 and 2 were slicker and more resistant to cleaning and scrubbing compared with those from Compounds 3 and 4 without organopolysiloxane moiety.

The present organopolysiloxane thus forms a water- and oil-repellent coating which is resistant to scrubbing and cleaning. The coating is so slick that it is easy to clean by wiping off fouling even when it is fouled. The present organopolysiloxane and the surface treatment composition comprising the same are useful for surface treating optical elements such as lenses of spectacles and antireflection filters.

The invention claimed is:

1. A fluorine-containing organopolysiloxane represented by the following average compositional formula (1)

$$(Z^2Q)_\beta Rf(QZ^1A_\alpha)_{2-\beta} \quad (1)$$

wherein Rf is a divalent group containing a perfluoroether residue,
Q is a divalent organic group,
$Z^1$ is a di- to nona-valent organopolysiloxane residue and may contain a silalkylene bond,
α is an integer of from 1 to 8,
β is a number larger than 0 and smaller than 2,
$Z^2$ is a monovalent group represented by the following formula (2)

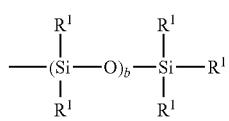

(2)

wherein b is an integer of from 1 to 10, $R^1$ may be the same with and different from each other and is an alkyl group having 1 to 4 carbon atoms or a phenyl group, and
A is a monovalent group represented by the following formula (3)

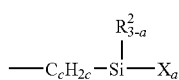

(3)

wherein $R^2$ is an alkyl group having 1 to 4 carbon atoms or a phenyl group, X is a hydrolyzable group, a is 2 or 3, and c is an integer of from 1 to 6.

2. The fluorine-containing organopolysiloxane according to claim 1, wherein $Z^2$ is a group represented by the following formula:

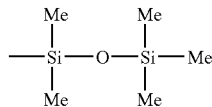

wherein Me is a methyl group.

3. The fluorine-containing organopolysiloxane according to claim 1, wherein $Z^1$ is a linear or cyclic organopolysiloxane residue having 2 to 8 silicon atoms.

4. The fluorine-containing organopolysiloxane according to claim 1, wherein $Z^1$ is a linear organopolysiloxane residue having 6 to 13 silicon atoms and 1 or 2 silethylene bonds.

5. The fluorine-containing organopolysiloxane according to claim 1, wherein the perfluoroether residue contains 1 to 500 repeating units represented by the following general formula:

$$-C_g F_{2g} O-$$

wherein g is independently an integer of from 1 to 6.

6. The fluorine-containing organopolysiloxane according to claim 1, wherein Rf is selected from the groups represented by the following general formulas (5), (6), and (7):

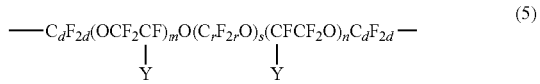

(5)

wherein Y may be the same with or different from each other and is a fluorine atom or a $CF_3$ group, r is an integer of from 2 to 6, d is an integer of from 1 to 3, each of m and n is an integer of from 0 to 200 with m+n ranging from 2 to 200, s is an integer of from 0 to 6, and the repeating units may be bonded randomly;

  (6)

wherein l is an integer of from 1 to 200 and d is an integer of from 1 to 3; and

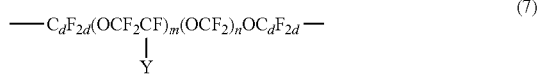  (7)

wherein Y is a fluorine atom or a $CF_3$ group, d is an integer of from 1 to 3, each of m and n is an integer of from 0 to 200 with m+n ranging from 2 to 200, and the repeating units may be bonded randomly.

7. The fluorine-containing organopolysiloxane according to claim 1, wherein Rf is represented by the following general formula (4):

  (4)

wherein e is an integer of from 0 to 50, f is an integer of from 1 to 50 with e+f raging from 2 to 60.

8. The fluorine-containing organopolysiloxane according to claim 1, wherein Q is a hydrocarbon group having 3 to 12 carbon atoms and may contain at least one bond selected from the group consisting of an amide bond, an ether bond, an ester bond and a vinyl bond.

9. The fluorine-containing organopolysiloxane according to claim 1, wherein X is selected from the group consisting of alkoxy groups, oxyalkoxy groups, acyloxy groups, alkenyloxy groups, and halogen atoms.

10. The fluorine-containing organopolysiloxane according to claim 9, wherein X is selected from the group consisting of methoxy group, ethoxy group, isopropenoxy group and chlorine atom.

11. A surface treatment composition comprising, as an active ingredient, the fluorine-containing organopolysiloxane according to any one of claims 1 to 10 and/or a partial condensate of hydrolyzates thereof.

12. An article treated with the surface treatment composition according to claim 11.

* * * * *